US012373811B2

(12) United States Patent
Costello

(10) Patent No.: US 12,373,811 B2
(45) Date of Patent: Jul. 29, 2025

(54) PERSON TRANSACTION TRACKING

(71) Applicant: NCR Voyix Corporation, Atlanta, GA (US)

(72) Inventor: Christopher John Costello, Suwanee, GA (US)

(73) Assignee: NCR Voyix Corporation, Atlanta, GA (US)

(*) Notice: Subject to any disclaimer, the term of this patent is extended or adjusted under 35 U.S.C. 154(b) by 0 days.

(21) Appl. No.: 18/125,485

(22) Filed: Mar. 23, 2023

(65) Prior Publication Data

US 2023/0230059 A1 Jul. 20, 2023

Related U.S. Application Data

(63) Continuation of application No. 16/221,465, filed on Dec. 15, 2018, now Pat. No. 11,704,650.

(51) Int. Cl.
*G06Q 20/20* (2012.01)
*G06V 40/16* (2022.01)

(52) U.S. Cl.
CPC ......... *G06Q 20/206* (2013.01); *G06Q 20/203* (2013.01); *G06Q 20/208* (2013.01); *G06V 40/172* (2022.01)

(58) Field of Classification Search
CPC .. G06Q 20/206; G06Q 20/203; G06Q 20/208; G06Q 20/4015; G06Q 20/40155; G06Q 20/4016; G06Q 20/405; G06V 40/172; G06V 20/52; G07G 3/00

See application file for complete search history.

(56) References Cited

U.S. PATENT DOCUMENTS

| | | | | |
|---|---|---|---|---|
| 10,282,720 | B1* | 5/2019 | Buibas | G06Q 20/40 |
| 2003/0197782 | A1* | 10/2003 | Ashe | H04N 7/18 |
| | | | | 348/150 |
| 2008/0087724 | A1* | 4/2008 | Kobres | G07G 1/0045 |
| | | | | 235/383 |
| 2014/0159869 | A1* | 6/2014 | Zumsteg | G07G 1/009 |
| | | | | 340/10.1 |
| 2015/0060543 | A1* | 3/2015 | Bellows | G06Q 30/06 |
| | | | | 235/385 |
| 2017/0185984 | A1* | 6/2017 | Leggo | G06Q 20/204 |
| 2020/0079412 | A1* | 3/2020 | Ramanathan | G06Q 20/208 |

* cited by examiner

*Primary Examiner* — Florian M Zeender
*Assistant Examiner* — Kimberly S. Bursum
(74) *Attorney, Agent, or Firm* — Schwegman Lundberg & Woessner, P.A.

(57) ABSTRACT

Images are captured of a customer during a transaction at a transaction terminal along with images associated with items of the transaction and any bags or cart used to hold the items. The images are processed to track any movement and locations of the customer, items, bags, and cart relative to a known location of the transaction terminal. When a transaction payment is required for the transaction and movement is detected in a direction that is moving away from the transaction terminal before a payment notification is received for the transaction, one or more alerts are raised as an indication to staff and/or security systems of a potential in-progress walk-away theft.

17 Claims, 4 Drawing Sheets

PERSON TRANSACTION TRACKING

CROSS-REFERENCE TO RELATED APPLICATION

This application is a continuation of U.S. patent application Ser. No. 16/221,465, filed Dec. 15, 2018, which application and publication is incorporated herein by reference in its entirety.

BACKGROUND

Self-Service Checkouts are prevalent in retail stores, especially grocery stores. These types of checkouts are popular because consumers can typically avoid longer cashier-assisted checkout lines and the retailer can reduce staffing levels with less cashiers, which correspondingly reduces retail overhead.

The technology associated with Self-Service Terminals (SSTs) has advanced in recent years, such that the SSTs can process a variety of loss-prevention and security software. This technology is largely focused on detecting: when a consumer fakes scanning a barcode to avoid payment of one item in a collection of items being purchased; when a consumer places a less expensive barcode for an item not being purchased on an item being purchased and scans less expensive barcode; and/or when a consumer intentionally or unintentionally enters an incorrect produce code for produce being purchased at the SST.

However, at least one type of theft has been largely unaddressed by the industry, which is when a consumer properly scans all items for the transaction and properly triggers the checkout option at the SST for payment. After the checkout option is activated, the consumer simply exits the store. During periods of heavy consumer traffic, even a SST attendant that assists consumers at all the SSTs may be unable to stop a consumer that walks away and exists the store. Compounding the problem, SSTs are intentionally placed at the exits of the store, such that time is of the essence in stopping the consumer, but the consumer is already just a short distance away from the exit when at the SST. This type of theft is referred to as "walk-away" theft in the industry.

Walk-away theft at SSTs accounts for an increasing amount of the overall loss experienced by retailers that provide SST checkout options to their consumers.

SUMMARY

In various embodiments, methods and a system for person transaction tracking are presented.

According to an embodiment, a method for person transaction tracking is presented. Movement of objects is tracked relative to a transaction terminal when a payment is requested for a transaction. An action is processed when at least one of the objects is tracked as moving away from the transaction terminal before the payment is received by the transaction terminal.

DETAILED DESCRIPTION

Figure 1:
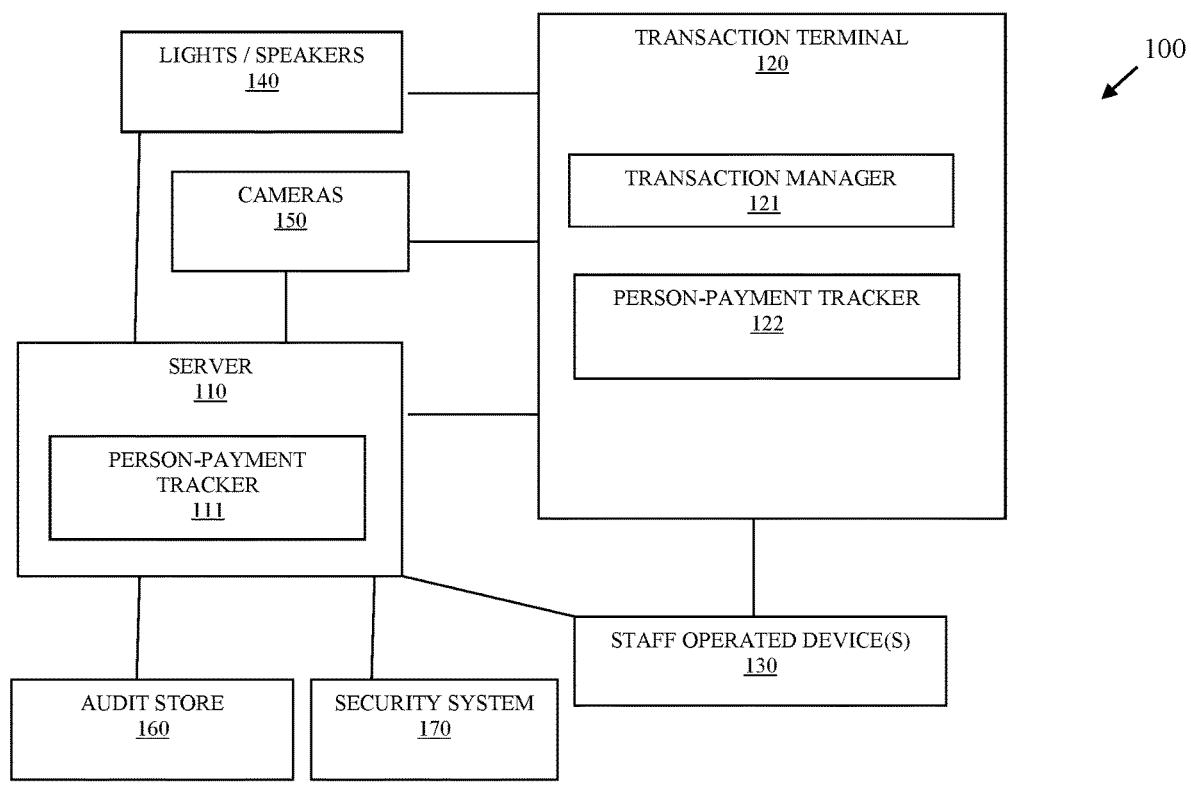
FIG. 1 is a diagram of a system for person transaction tracking, according to an example embodiment.

FIG. 1 is a diagram of a system 100 for person transaction processing, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of person transaction tracking, presented herein and below.

As used herein and below, the terms "customer," "consumer," and "user" may be used interchangeably and synonymously.

The system 100 includes a server 110 having a person-payment tracker 111; a transaction terminal having a transaction manager 121 and a person-payment tracker 122; staff-operated devices 130, lights and/or speakers 140; cameras 150; an audit store 160, and, optionally, a security system 170.

The person-payment tracker 111, the transaction manager 121, and the person-payment tracker 122 are provided as executable instructions that reside in a non-transitory computer-readable storage medium and are executed on a hardware processor of the device (110 or 120) to which they are associated.

When a customer initiates a Self-Checkout (SCO) transaction at the transaction terminal 120, a transaction identifier is generated by the transaction manager 121 for the SCO transaction. The transaction manager 121 provides to the person-payment tracker 111 (when executed from the server 110) or the person-payment tracker 122 (when executed on the transaction terminal 120).

Images that are captured by the cameras 150 are obtained and processed by the person-payment tracker 111 or 122 for purposes of tracking the movement and placement of items being scanned at the transaction terminal 120 and for purposes of tracking the movement, location, and/or direction of movement of the consumer.

It is to be noted that the imaging processing performed on the images by the person-payment tracker 111 or 122 does not need to perform item recognition to uniquely identify the items and does not need to perform specific identification of the consumer. So, features from the pixels of the images are sampled to identify attributes that are uniquely associated with a tracked person and uniquely associated with a tracked item. Each unique transaction identifier for each SCO transaction uniquely derives attributes that can be processed from image frames to identity a specific person associated with that transaction (whose identity is unknown) and to identify a specific item associated with that transaction (whose item code is unknown). That is, the transaction manager 121 acquires the item codes for the items that are scanned but the item codes are unnecessary for the processing performed by the person-payment tracker 111 or 122; and the transaction manager 121 may or may not know the identity of the consumer performing the SCO transactions (may know when the consumer scans a loyalty card or manually enters unique information that identifies a loyalty account), but the identity of the consumer is unnecessary for the processing performed by the person-payment tracker 111 or 122.

Because item identification and consumer identification is unnecessary for the processing performed by the person-payment tracker 111 or 122, the processing throughput is efficient and timely. This allows decisions being made by the person-payment tracker 111 or 122 and any alerts raised based on those decisions to be resolved before a consumer engaged in walk-away theft can leave the store and/or leave the surrounding premises of the store.

In addition, the person-payment tracker 111 or 122 can track the bags and/or cart to which the items are placed in by the consumer at the transaction terminal 110. Again, this can be done through pixel attributes that identify the bags and/or the cart of the consumer from the images provided by the cameras 150.

In fact, when bags/carts are being used by the customer (customer has more than just a few items). The person-payment tracker 111 or 122 tracks each item to a bag or cart and then just tracks the bag(s) or the cart unless images for the bag(s) or cart indicate that an item is removed from the bag or the cart, in which case that item can be tracked separately for the bag or the cart.

So, the person-payment tracker 111 or 122 tracks movement of the items from the scanning to a destination for the item (a bag or a cart). There is no need to further track any item once the movement of that item ceases and a destination (a bag or a cart) is identified for the time. At this point (again unless an item is removed), the bag or the cart are tracked through transaction payment for the SCO transaction.

It is also to be noted that in some embodiments discussed herein and below, there are two separate and cooperating instances of the person-payment tracker that includes both 111 (executing on the transaction terminal 110) and 122 (executing on the server 120). So, there can be a single instance of the person-payment tracker 111 or 122; or two independent can cooperating person-payment trackers 111 and 122 (as discussed below).

The images captured by the cameras 150 can be from a variety of different sources and locations of the store. For example, cameras 150 may be situated overhead above the terminal 120, on the top of shelving, at the exit of the store), on the ceiling throughout the store, etc. Each image carries metadata that at least provides a time stamp and a camera identifier that uniquely identifies a particular camera 150 from the other cameras 150. The person-payment tracker 111 or 122 can access a table or other data storage area that maps the camera identifier for each camera 150 to a specific store location (e.g., at the exit, over a specific transaction terminal 120, above a customer service desk, between a bank of transaction terminals 120 and the customer service desk, etc.).

In an embodiment, at least one or more of the cameras 150 may be integrated within a scanner that is a peripheral of the terminal 120 and used for item code scanning during the SCO transaction.

Additionally, the images are received as image frames (a series of successive images in a very short period of time) as video from the cameras 150. The image frames may be streamed directly to the terminal 120 and/or server 110 for temporary storage in a designated area accessible to the person-payment tracker 111 and/or 122 for processing during the transaction.

When the SCO transaction on the terminal 120 is placed into a transaction payment mode for obtaining transaction payment, the transaction manager 121 provides the current time to the person-payment tracker 111 and/or 122 and transaction identifier (which, optionally, was already received by the person-payment tracker 111 and/or 122 when the SCO transaction was started by the customer on the terminal 120). The person-payment tracker 111 and/or 122 identifies the current location being tracked for the customer, the items when no bag or cart is being used by the customer (e.g., just a small quantity of times being purchased), and/or the customer's bag/cart having the items associated with the SCO transaction.

The person-payment tracker 111 and/or 122 expects to next receive a notice from the transaction manager 121 that payment for the SCO transaction was received and processed by the transaction manager 121 before movement of the items, bag(s), cart, and customer is detected moving away from the transaction terminal 120.

That is, after receiving the time that the payment processing was initiated by the transaction manager 121, the person-payment tracker 111 and/or 122 is configured to expect to see a notice that payment was received and the SCO transaction is complete from the transaction manager 121, and the person-payment tracker 111 and/or 122 expects to see this payment notification before tracking movement of the item, bag(s), cart, or customer moves away from the terminal 120 (by processing the images being received in the frames from the cameras 150).

If movement of the above-mentioned objects being tracked occurs without receiving payment notification from the transaction manager 121 for the SCO transaction, then the person-payment tracker 111 and/or 122 can raise a variety of alerts and perform a variety of processing so as to alert staff at the store that a potential walk-away theft is in progress at the store.

Each of the alerts and processing described below are not mutually exclusive of the other alerts and processing described below, such that all of the alerts described herein can be performed or a desired combination of the alerts described herein can be performed. In addition, and in one embodiment, just a single alert or processing step can be performed.

The alerts and processing can include, by way of example only, changing a color or effect (strobing, flashing, intensity, etc.) of: one or more lights 140 at, near, or integrated into the terminal 120; one or more lights 140 at a supervisory terminal that manages the terminals 120, one or more lights 140 at exits to the store, etc. An alarm sound or a prerecorded voice message may be played over one or more speakers 140 (situated at any location that the lights 140 were described as being located within the store). A customized message may be sent to designated staff operated devices 130 or all staff-operated devices 130 of the store (this can be sent as an SMS text, as a customized mobile application pushed message, as a store wide system message). The customized message may include a variety of information, such as and by way of example only, transaction identifier for the SCO transaction, item list for the items of the transaction, date and time, transaction terminal identifier for the terminal 120, and/or at least one still image taken of the customer situated in front of the terminal 120 during the SCO transaction. An automated alert code or message may be sent to an existing security system 170 of the store. The existing security system 170 may perform a variety of actions based on receiving the alert code, such as activating the lights 140, playing the sounds or messages over the speakers 140, sending customized messages to the staff operated devices 130, and other actions. Additionally, processing may include instructing the transaction manager 121 to pause the SCO transaction on the terminal 120 preventing a next transaction from being initiated on the terminal 120 until an override resets the transaction manager 121 or clears the non-paid for SCO transaction.

In addition, all the frames captured in the images processed by the person-payment tracker 111 and/or 122 as well as the transaction data (obtained from the transaction manager 121) are recorded in an audit store 160 for subsequent evaluation and/or as evidence of the potential walk-away theft.

In an embodiment, the person-payment tracker 111 and/or 122 are also configured to detect false positives so as to avoid raising any alert or performing any security processing when a true walk-away theft is not in progress after detecting movement of the items, bag(s), cart, or customer before a transaction payment notification is received from the transaction manager 121.

For example, a customer may decide not to pay for the transaction and leave the store while leaving the items at the transaction terminal 120. Here, the person-payment tracker 111 and/or 122 does detect the movement of the customer away from the terminal 120 and through the exit of the store but the person-payment tracker 111 and/or 122 also notes that the items, bag(s), and cart are still situated where placed by the customer when transaction payment processing was initiated at the terminal 120 by the customer. Although, this is not a desirable action for a customer to do, it may be perfectly legitimate, such as when the customer realizes he has no payment card or cash to pay for the items. Therefore, the person-payment tracker 111 and/or 122 is configured to detect this situation and not cause any alert or security processing. The person-payment tracker 111 and/or 122 may, however, log the information (transaction images, item detail, transaction terminal identifier, date, time, image frames for the transaction, etc.) in the audit store 160 and may, optionally, send a non-urgent message to staff operated devices 130 to retrieve the item from the transaction terminal 120 for re-shelving them within the store.

Another false positive that the person-payment tracker 111 and/or 122 are designed to detect, is when the customer leaves the transaction terminal 120 before payment because there is a problem that the customer wants to discuss with staff at a customer-service desk of the store. Here, two cooperating instances of the person-payment tracker 111 and 122 detect that the customer (though the images from multiple cameras 150) is moving in the direction of the customer-service desk and is not moving toward the exit of the store, the person-payment trackers 111 and 122 holds off on raising any alert and performing any security processing when the direction of movement of the customer is in the direction of the customer-service desk and then detects that the customer is at the desk. Here, the items, bag(s), and cart may or may not move with the tracked customer. Again, there may be a perfectly legitimate reason for this, such as the customer believes an improper discount was given for an item of the transaction at the terminal 120, the customer wants the items held at the service desk until the customer can return with payment for the items, the customer wants certain ones of the items removed from the transaction before payment, etc. This same type of false-positive awareness processing can also be when the customer is desiring assistance at one of or any of the attendant-based stations of the store (such as a managing attendant station that manages the transaction terminals 120 or a cashier-assisted terminal manned by a cashier that is adjacent to the terminal 120 at cashier-assisted checkout lanes).

In an embodiment, the person-payment tracker 111 and/or 122 can wait until an image appears in front of the terminal 120 having features known to be associated with a person. Once such an image is detected, the image is locked onto and specific features associated with the customer are extracted to continue to track the subsequent images and to uniquely identify the customer from other customers whose images are being tracked. It is noted that this does not entail any biometric customer identification, such enough features assigned to an unknown customer that uniquely identifies that customer from the images frames. A machine-learning algorithm may be used to get specific enough that any given customer can be distinguished from all other customers, such that the audit store 160 can be used to identify a repeating walk-away theft offender involved in multiple walk-away thefts.

Similarly, although specific item code identification is unnecessary the person-payment tracker 111 and/or 122 may extract enough features to unique track an unknown item being purchased from other items being purchased for any given SCO transaction.

If a payment notification is properly received from the transaction manager 121 before the items, bag(s), cart, and customer are detected as moving away from the terminal 120 during a given SCO transaction, the person-payment tracker 111 and/or 122 stops all tracking and waits for a next transaction initiation on the terminal 120. The gathered information (including image frames that were processed) may be discarded or if desired stored in the audit store as a successful transaction (such storage may be used for deep learning image training).

In an embodiment, the transaction terminal 120 is a Self-Service Terminal (SST). In an embodiment, the transaction terminal 120 us a Point-Of-Sale (POS) terminal operated by staff of the store when assisting customer checkouts.

These embodiments and other embodiments are now discussed with reference to the FIGS. 2-4.

Figure 2:
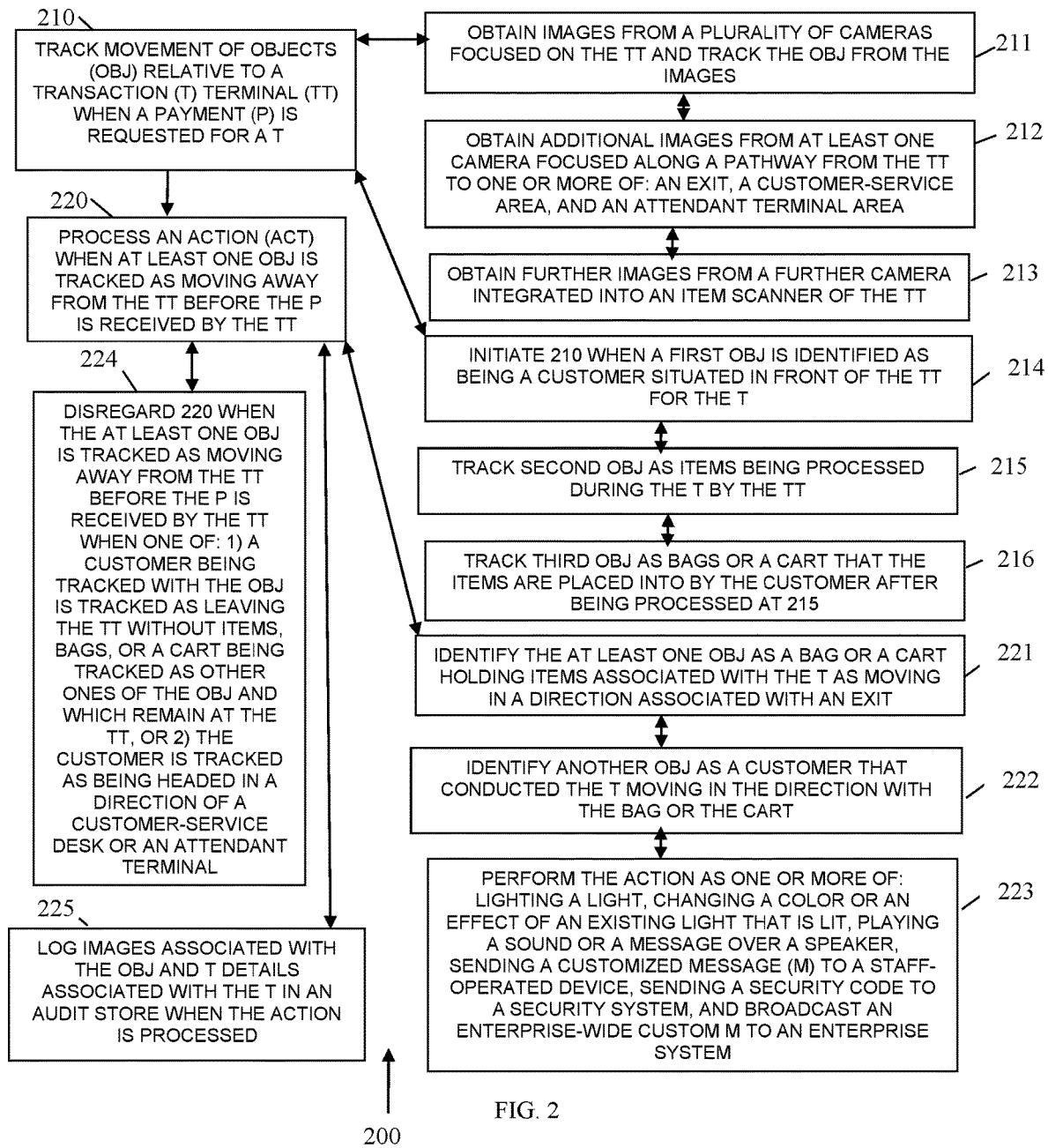
FIG. 2 is a diagram of a method for person transaction tracking, according to an example embodiment.

FIG. 2 is a diagram of a method 200 for person transaction tracking, according to an example embodiment. The software module(s) that implements the method 200 is referred to as a "transaction payment tracker." The transaction payment tracker is implemented as executable instructions programmed and residing within memory and/or a non-transitory computer-readable (processor-readable) storage medium and executed by one or more processors of a device. The processor(s) of the device that executes the transaction payment tracker are specifically configured and programmed to process the transaction payment tracker. The transaction payment tracker has access to one or more network connections during its processing. The network connections can be wired, wireless, or a combination of wired and wireless.

In an embodiment, the device that executes the transaction payment tracker is the transaction terminal 120. In an embodiment, the transaction terminal 120 is a SST.

In an embodiment, the device that executes the transaction payment tracker is the server 110.

In an embodiment, multiple cooperating instances of the transaction payment tracker process on both the transaction terminal 120 and the server 120.

In an embodiment, the transaction payment tracker is both or one of: the person-payment tracker 122 and/or the person-payment tracker 111.

At 210, the transaction payment tracker tracks movements of objects relative to a transaction terminal when a payment is requested for a transaction. In an embodiment, the transaction payment tracker is notified to start tracking the movements after a transaction manager 121 executing on a SST 120 provides a notice to the transaction payment tracker that payment is needed to complete the transaction. It is noted that the location of a customer, items of the transaction, any bags associated with the transaction, and any cart associated with the transaction are tracked before the notice is received from the transaction terminal that location is used to track the movements of the objects (customer, items, bags, and cart).

In an embodiment, at 211, the transaction payment tracker obtains the images from a plurality of cameras that are focused on the transaction terminal and the transaction payment tracker tracks the objects from the images (by image processing features and attributes associated with people, items, bags, and carts from the images—as discussed above with the FIG. 1).

In an embodiment of 211 and at 212, the transaction payment tracker obtains additional images from at least one camera focused along a pathway from the transaction terminal to one or more of: an exit, a customer-service desk/area, and an attendant terminal/area. This is relevant to any false-positive walk-away theft believed to be detected by the transaction payment tracker from the images.

In an embodiment of 212 and at 213, the transaction payment tracker obtains further images from a further camera integrated into an item scanner of the transaction terminal. Such camera provides a clear image of a face and other features of the customer conducting the transaction at the transaction terminal. The item scanner also used during the transaction by the transaction manager 121 to scan item barcodes for the items of the transaction.

In an embodiment, at 214, the transaction payment tracker initiates the tracking at 210 when a first object is identified as being a customer situated in front of the transaction terminal for the transaction.

In an embodiment of 214 and at 215, the transaction payment tracker tracks second objects as items being processed during the transaction by the transaction terminal.

In an embodiment of 215 and at 216, the transaction payment tracker tracks a third objects as bags and/or a cart that item are placed into by the customer after being processed at 215.

At 220, the transaction payment tracker processes an action when at least one of the objects is tracked as moving away from the transaction terminal before payment is received by the transaction terminal (which indicates potential walk-away theft by the customer).

In an embodiment, at 221, the transaction payment tracker identifies the at least one object as a bag or a cart holding items associated with the transaction and moving in a direction associated with an exit of the store.

In an embodiment of 221 and at 222, the transaction payment tracker identifies another object as a customer that is conducting the transaction and is moving in the direction with the bag or the cart towards the exit.

In an embodiment of 222 and at 223, the transaction payment tracker performs the action as one or more of: lighting a light, changing a color or an effect of an existing light that is already kit, playing a sound or a message over a speaker, sending a customized message to a staff-operated device, sending a security code to a security system, and/or broadcasting an enterprise or store-wide custom message to an enterprise or store system. This can be any of the actions discussed above with the FIG. 1.

In an embodiment, at 224, the transaction payment tracker disregards or does not process the action when the object is tracked as moving away from the transaction terminal before the payment is received for the transaction when a false-positive movement is detected. The false-positive movement is detected as being a customer that is leaving the store without the items in the hands, bags, or the cart (which all remain in their original location at the time payment was requested for the transaction). The false-positive movement may also be detected as being the customer with or without the items, bags, and/or cart headed in a direction of a customer-service desk/area or an attendant terminal/area of the store.

In an embodiment, at 225, the transaction payment tracker logs the images associated with the objects and transaction details associated with the transaction in an audit store (such as audit store 160) when the action is processed by the transaction payment tracker.

When the transaction payment tracker processes the action it is timely enough confront the customer at the exit or on the premises before the customer can leave the premises by staff of the store. In cases, where the customer is able to exits before staff can attend to the situation, cameras situated on the exterior or on the premises of the store may continue to track the customer and capture, potentially, a license plate of any vehicle driven by the customer.

Figure 3:
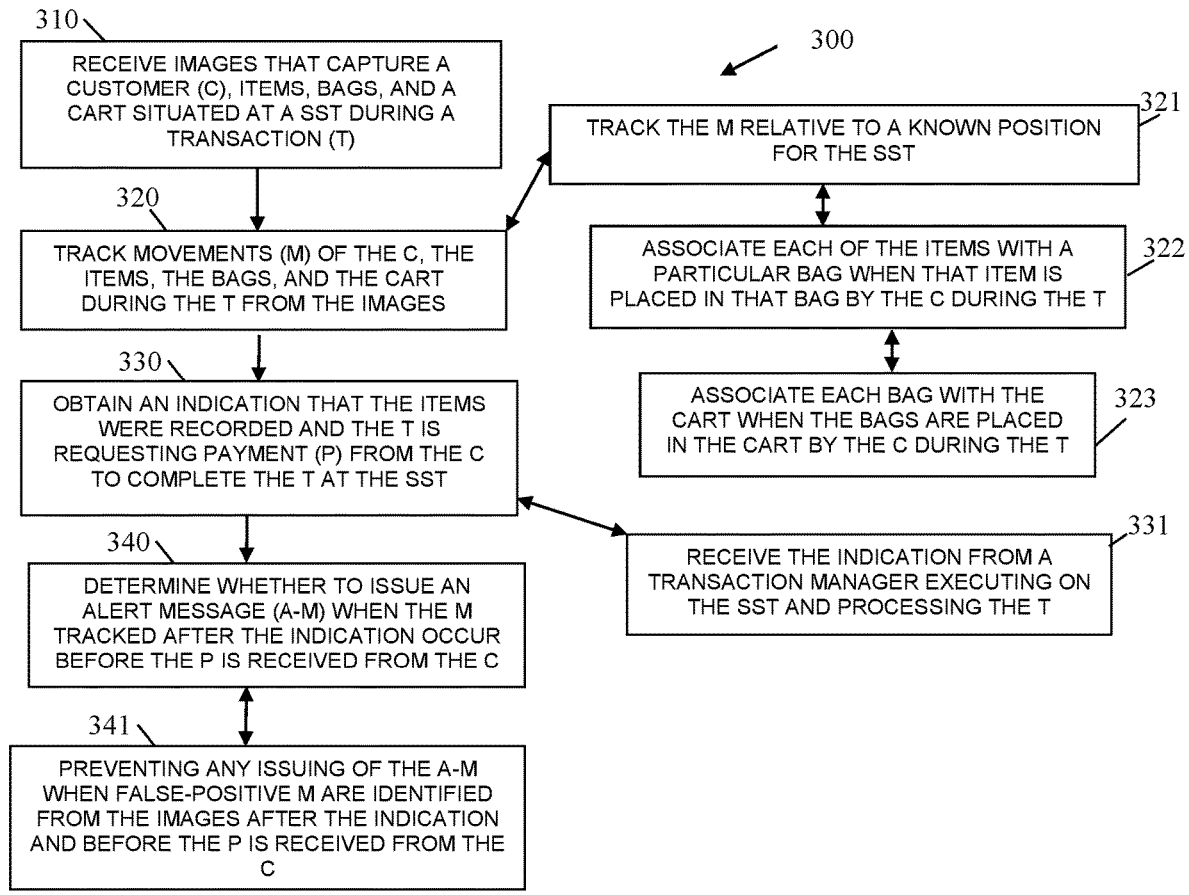
FIG. 3 is a diagram of another method for person transaction tracking, according to an example embodiment.

FIG. 3 is a diagram of another method 300 for person transaction tracking, according to an example embodiment. The software module(s) that implements the method 300 is referred to as a "payment verifier." The payment verifier is implemented as executable instructions programmed and residing within memory and/or a non-transitory computer-readable (processor-readable) storage medium and executed by one or more processors of a device. The processors that execute the payment verifier are specifically configured and programmed to process the payment verifier. The payment verifier has access to one or more network connections during its processing. The network connections can be wired, wireless, or a combination of wired and wireless.

In an embodiment, the device that executes the payment verifier is the transaction terminal 120. In an embodiment, the transaction terminal 120 is a SST.

In an embodiment, the device that executes the payment verifier is the server 110.

In an embodiment, multiple cooperating instances of the payment verifier execute on both the transaction terminal 120 and the server 110.

In an embodiment, the payment verifier is both of or one of: the person-payment tracker 111 and/or the person-payment tracker 122.

The payment verifier represents another and in some ways enhanced processing perspective from that which was described with the method 200 of the FIG. 2.

At 310, the payment verifier receives images that capture a customer, items, bags, and a cart situated at a SST during a transaction.

At 320, the payment verifier tracks movement of the customer, the items, the bags, and the cart during the transaction from the images (in real time).

In an embodiment, at 321, the payment verifier tracks the movement relative to a known position for the SST.

In an embodiment of 321 and at 322, the payment verifier associates each of the items with a particular bag when that item is placed in that bag by the customer during the transaction. That is, the payment verifier knowns the locations of the bags that hold the items once those items are deposited into those bags during the transaction.

In an embodiment of 322 and at 323, the payment verifier also associates each bag with the cart when the bags are placed in the cart by the customer during the transaction.

At 330, the payment verifier obtains an indication that the items were recorded and the transaction is requesting payment from the customer to complete the transaction at the transaction terminal.

In an embodiment, at 331, the payment verifier receives the indication from a transaction manager 121 executing on the transaction SST 120 and processing the transaction.

At 340, the payment verifier determines whether to issue an alert message when the movements tracked after the indication occur before the payment is received from the customer at the transaction terminal.

According to an embodiment, at 341, the payment verifier prevents any issuing of the alert message when false-positive movements are identified from the images after the indication and before the payment is received from the customer at the SST.

It is noted that the alert message can be any of the alerts or processing (including security processing) discussed above with respect to the FIGS. 1-2.

Figure 4:
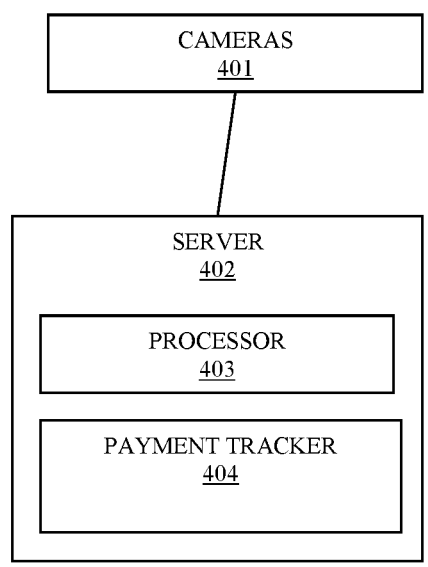
FIG. 4 is a diagram of another system for person transaction tracking, according to an example embodiment.

FIG. 4 is a diagram of a system 400 for person transaction tracking, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1-3 with respect to the transaction terminal 110, the server 120, and the cameras 150.

The system 400 includes a plurality of cameras 401 and a server 402. The server 402 includes at least one hardware processor 403 and configured to execute executable instructions from a non-transitory computer-readable storage medium as payment tracker 404.

The cameras 401 are configured to capture images at and in proximity to (surrounding) a SST.

The payment tracker 404 when executed from the non-transitory computer-readable storage medium on the processor 403 is configured to: 1) track movements from the images for: a customer, items, bags, and a cart relative to a known position for the SST during a transaction at the SST; and 2) process security instructions when at least some of the movements indicate walk-away theft by the customer before the items for the transaction are paid for by the customer.

In an embodiment, the payment tracker 404 is further configured to: perform processing to identify false-positive movements from the movements and avoid processing the security instructions when the false-positive movements are identified.

In an embodiment, the false positive movements are movements identified as a customer walking away from the SST without taking the items and existing the store, or movements identified as the customer with or without the items walking away from the SST in the direction of a customer-service desk or an attendant terminal within the store.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
receiving a transaction identifier for a self-service transaction initiated at a terminal by a person;
obtaining images captured by cameras depicting the person, the terminal, and items associated with the self-service transaction, wherein the cameras are configured to capture the images at and in proximity to the terminal;
sampling pixels from the images to uniquely identify the person, the terminal, a cart or a bag of the person, and the items without associating the person to a known identity and without associating the items with known item codes;
tracking, through the sampled pixels from the images, movement of the items with respect to the cart or the bag; and
raising an alert when the tracking indicates at least one of the items remains in the cart or the bag as the cart or bag is moving away from the terminal toward an exit of a store before a payment notification is received from the terminal;
wherein a person-payment tracker processes the tracking and a particular alert before a customer engaged in a walk-away theft can leave the store and leave surrounding premises of the store;
wherein the transaction terminal is configured to pause, based on an alert code associated with the alert, the self-service transaction and prevent a next self-service transaction on the terminal until an override resets or clears a non-payment issue associated with the at least one item;
wherein raising further includes delaying the raising of the alert when the tracking indicates the person left behind the items, cart, or bag but is determined to be heading in a direction of a customer service desk and not in a direction of the exit.

2. The method of claim 1 further comprising, obtaining second images from second cameras that track the person outside of the store and identifying from the second images a license plate of a vehicle to which the person was detected as entering after exiting the store when the alert was raised.

3. The method of claim 1 further comprising, logging corresponding images of the items, the bag, or the cart, an identifier for the terminal, a date, and time in an audit store when the tracking indicates the person exited the store but left the items, the bag, or the cart behind at the terminal.

4. The method of claim 3, further comprising, sending a notification to a staff operated device of the store to retrieve the items, bag or cart from the terminal to re-shelve the items left behind by the person.

5. The method of claim 1, wherein delaying further includes separately tracking the items, cart, or bag at the terminal and movement of the person inside the store until the person exits the store with the items, bag, or cart after paying for the self-service transaction, exits the store without the items, bag, or cart, or exits the store with the items, bag, or cart without paying in which case the alert is raised.

6. The method of claim 1, wherein obtaining further includes obtaining at least one image from a camera integrated into a scanner of the terminal.

7. The method of claim 1, wherein obtaining further includes obtaining the images as image frames of videos captured by the cameras.

8. The method of claim 1, wherein raising further includes raising the alert by playing sounds or messages over one or more speakers in the store and activating one or more lights of the store associated with theft notifications.

9. The method of claim 1, wherein raising further includes storing the images corresponding to the self-service transaction, a terminal identifier for the terminal, a self-service transaction identifier for the self-service transaction, transaction data processed by the terminal for the self-service transaction, a current date, and a current time of day in an audit store.

10. A method, comprising:
monitoring at least one video depicting a terminal, a person, at least one item, any bag, and any cart when the terminal reports the person initiated a self-service transaction on the terminal for the at least one item;
sampling pixels of image frames of the at least one video for pixels associated with each of the person, the at least one item, the bag when depicted, and the cart when depicted;
tracking movements of the at least one item into the bag when depicted, and into the cart when depicted based on the sampled pixels;
maintaining a current first location for the at least one item and a current second location for the person based on the tracking;
receiving a payment started notification from the terminal indicating that the person has initiated a payment for the self-service transaction; and causing an alert to be raised when the current second location is associated with the person exiting a store, the current first location indicates the person is in possession of the at least one item, and the terminal has not reported a payment processed notification for the payment;
wherein the alert is processed and issued before a customer can leave the store and leave surrounding premises of the store;
wherein the terminal is configured, based on an alert code associated with the alert, to pause a next self-service transaction from being initiated on the terminal until an override resets or clears a non-payment issue associated with the at least one item;
wherein causing further includes instructing the terminal to suspend the self-service transaction and prevent a next self-service transaction from being started on the terminal when the current second location is associated with a direction towards a customer service desk and is not associated with a second direction towards an exit of the store and further delaying the raising of the alert.

11. The method of claim 10, wherein causing further includes activating sounds or messages over one or more speakers of the store when the alert is raised.

12. The method of claim 10, wherein instructing further includes separately monitoring the at least one item at the current first location in a first video and the person traveling from the current second location towards the customer service desk.

13. The method of claim 10, wherein causing further includes instructing the terminal to suspend the self-service transaction and prevent the next self-service transaction from being started on the terminal when the current second location is associated with a direction towards a self-service attendant desk and is not associated with a second direction towards an exit of the store and further delaying the raising of the alert.

14. The method of claim 10, wherein causing further includes raising the alert and storing the image frames corresponding to the person, the terminal, the at least one item, the cart when detected, the bag when detected, a terminal identifier for the terminal, a transaction identifier for the self-service transaction, a current date, and a current time of day in an audit store.

15. The method of claim 10 further comprising, notifying a staff-operated device of the store for staff to reshelve the at least one item located at the terminal when the alert is not raised and the current first location indicates the person exited the store without being in possession of the at least one item and without paying for the self-service transaction.

16. A system, comprising:
cameras situated through a store to capture videos;
a transaction terminal to process self-service transactions;
a server comprising a processor and a non-transitory computer-readable storage medium; and
the non-transitory computer-readable storage medium comprising instructions, which when executed by the processor cause the processor to perform operations comprising:
receiving a transaction-initiated notification from the transaction terminal for a person checking out at the transaction terminal with at least one item during a current self-service transaction;
obtaining image frames from a video of a corresponding camera depicting the transaction terminal, the at least one item, a bag when depicted, a cart when depicted, and the person based on the transaction-initiated notification;
sampling pixels from the image frames of the video that are unique to the person, each of the at least one item, the bag when depicted, and the cart when depicted;
tracking movements of the person, each of the at least one item, the bag when depicted, and the cart when depicted from the sampled pixels in the image frames;
maintaining a current first location for the person and current second locations for each of the at least one item based on the tracking; and
raising an alert when the current first location is determined to be in a direction associated with an exit of the store, at least one of the current second locations coincides with the current first location, and the transaction terminal has not provided a payment received notification for a payment made by the person for the current self-service transaction, wherein the transaction terminal is configured, based on an alert code associated with the alert, to pause the self-service transaction and prevent a next self-service transaction on the transaction terminal until an override resets or clears a non-payment issue associated with the at least one item;

wherein security instructions are processed before a customer can leave the store and leave surrounding premises of the store;

wherein raising further includes delaying the raising of the alert when the tracking indicates the person left behind one or more items, the cart, or the bag but is determined to be heading in a direction of a customer service desk and not in a direction of the exit.

17. The system of claim 16, wherein the operations further comprise maintaining the image frames, a terminal identifier for the transaction terminal, transaction details produced by the transaction terminal, a transaction identifier for the current self-service transaction, a current date, and a current time of day in an audit store when the alert is raised.

* * * * *